(12) United States Patent
Steinhauser et al.

(10) Patent No.: US 7,674,203 B2
(45) Date of Patent: Mar. 9, 2010

(54) METHOD FOR THE OPERATION OF A DRIVETRAIN

(75) Inventors: Klaus Steinhauser, Kressbronn (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 482 days.

(21) Appl. No.: 11/804,032

(22) Filed: May 16, 2007

(65) Prior Publication Data

US 2007/0287590 A1    Dec. 13, 2007

(30) Foreign Application Priority Data

Jun. 8, 2006    (DE) .................. 10 2006 026 596

(51) Int. Cl.
*F16H 61/26*    (2006.01)
(52) U.S. Cl. .................. 477/130; 477/156; 477/164
(58) Field of Classification Search .................. 477/115, 477/127, 130, 156, 163, 164
See application file for complete search history.

(56) References Cited

U.S. PATENT DOCUMENTS

| | | | |
|---|---|---|---|
| 5,113,343 A | 5/1992 | Hunter et al. | |
| 6,375,597 B1 * | 4/2002 | Popp et al. | 477/97 |
| 6,413,189 B1 * | 7/2002 | Spiess et al. | 477/110 |
| 6,508,742 B2 | 1/2003 | Popp et al. | |
| 6,577,939 B1 | 6/2003 | Keyse et al. | |
| 6,623,397 B1 | 9/2003 | Raghavan et al. | |
| 6,832,976 B2 | 12/2004 | Nishida et al. | |
| 6,926,640 B2 * | 8/2005 | Iwamoto et al. | 477/175 |
| 7,056,264 B2 * | 6/2006 | Kupper et al. | 477/180 |
| 2003/0220170 A1 | 11/2003 | Nishida et al. | |
| 2005/0282680 A1 | 12/2005 | Soh | |
| 2006/0046892 A1 | 3/2006 | Bucknor et al. | |
| 2007/0129211 A1 | 6/2007 | Steinhauser et al. | |

FOREIGN PATENT DOCUMENTS

| | | |
|---|---|---|
| DE | 199 18 734 A1 | 11/2000 |
| DE | 199 28 674 A1 | 12/2000 |
| DE | 199 63 752 A1 | 7/2001 |
| DE | 100 35 479 A1 | 2/2002 |
| DE | 103 21 961 A1 | 2/2004 |
| DE | 103 38 624 A1 | 11/2004 |
| DE | 103 30 153 A1 | 2/2005 |
| DE | 103 61 288 A1 | 7/2005 |
| DE | 10 2004 001 380 A1 | 8/2005 |
| DE | 10 2004 010 269 A1 | 9/2005 |

(Continued)

*Primary Examiner*—Ha D. Ho
(74) *Attorney, Agent, or Firm*—Davis & Bujold, P.L.L.C.

(57) ABSTRACT

Method of operating a drivetrain, comprising at least an automatic transmission and a drive motor, for improving a speed of successive upshifts or successive downshifts in an overlap manner so that, during a first upshift or downshift, at least one shift element, required for a subsequent second upshift or downshift, is prepared during the first upshift or downshift and, when a synchronization point is reached, the subsequent second upshift or downshift can be carried out immediately. Two successive respective upshifts or downshifts can be carried out as an overlapping single shift by actuating first, second and third shift elements. Implementing the first and the second upshifts or downshifts so that actuation of the second shift element, from the first upshift or downshift to the subsequent second upshift or downshift, occurs via a minimum selection of a first alternative or by a maximum selection of a second alternative.

14 Claims, 4 Drawing Sheets

FOREIGN PATENT DOCUMENTS

| | | |
|---|---|---|
| DE | 10 2005 008 383 A1 | 9/2005 |
| DE | 10 2004 040 611 A1 | 3/2006 |
| DE | 10 2004 041 507 A1 | 3/2006 |
| DE | 10 2004 043 345 A1 | 3/2006 |
| EP | 1 219 868 A2 | 7/2002 |
| EP | 1 398 536 A2 | 3/2004 |
| EP | 1 533 543 A2 | 5/2005 |
| WO | WO-2004/097266 A1 | 11/2004 |
| WO | WO-2005/065981 A1 | 7/2005 |

\* cited by examiner

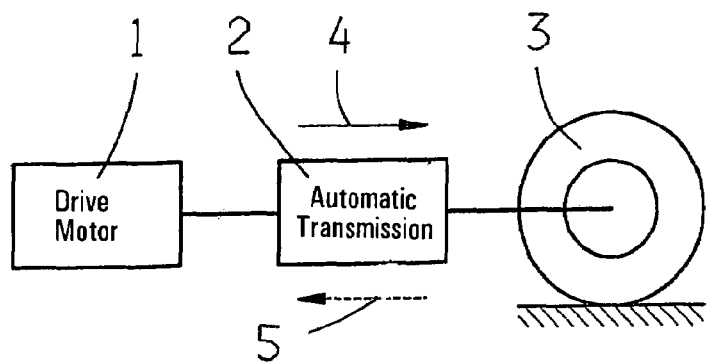
Fig. 1
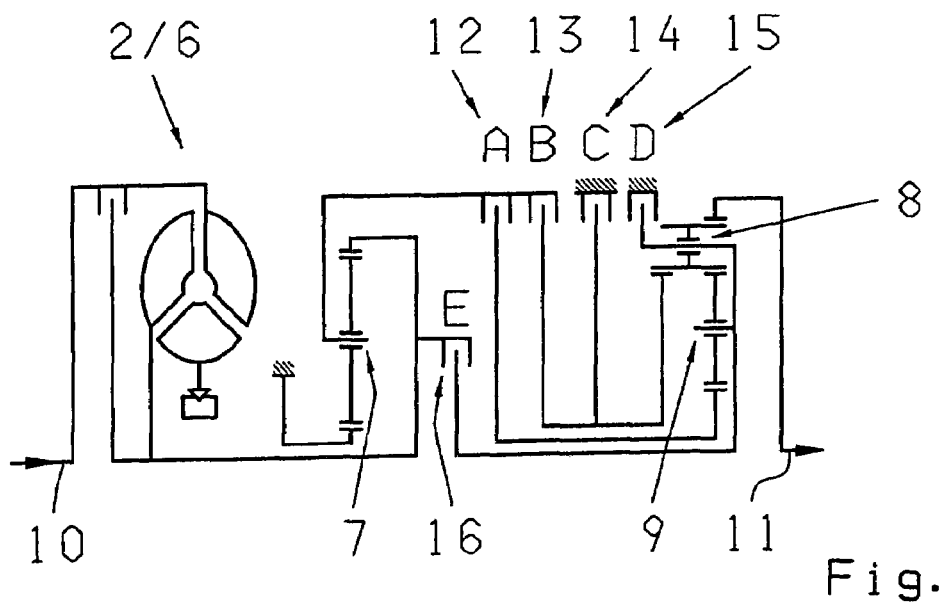
Fig. 2
|   | A | B | E | C | D |
|---|---|---|---|---|---|
| 1 | • |   |   |   | • |
| 2 | • |   |   | • |   |
| 3 | • | • |   |   |   |
| 4 | • |   | • |   |   |
| 5 |   | • | • |   |   |
| 6 |   |   | • | • |   |
| R |   | • |   |   | • |
Fig. 3

METHOD FOR THE OPERATION OF A DRIVETRAIN

This application claims priority from German Application Serial No. 10 2006 026 596.3 filed Jun. 8, 2006.

FIELD OF THE INVENTION

The invention concerns a method for the operation of a drivetrain of a motor vehicle comprising at least an automatic transmission and a drive motor.

BACKGROUND OF THE INVENTION

The main components of a motor vehicle drivetrain are a drive motor and a transmission. The transmission converts torques and speeds and so transforms the traction force provided by the drive motor. The present invention concerns a method for operation of a drivetrain which comprises at least a drive motor and an automatic transmission, the automatic transmission having a total of five shift elements of which to transfer the torque or force, in any forward gear and in a reverse gear, in each case two shift elements are engaged and three shift elements are open. In the context of the present invention the term 'automatic transmission' is understood to mean any transmission that effects automatic gear changes, these also being known as variable-speed transmissions.

From DE 100 35 479 A1 a method for operating an automatic transmission is known, in which successive upshifts and successive downshifts can be carried out with some overlap in order to improve the shift speed. For this, during each first upshift or downshift, a shift element needed for the subsequent second upshift or downshift is prepared while the first upshift or downshift is in progress in such manner that when a synchronization point, namely, a synchronous speed of the first upshift or downshift in progress is reached, the subsequent second upshift or downshift can be carried out immediately.

In this way, according to DE 100 35 479 A1, single shifts are overlapped with one another which means that each first upshift or downshift carried out and each subsequent second upshift or downshift is a single shift between two directly successive gears.

Starting from this, the present invention addresses the problem of providing a new type of method for the operation of a drivetrain comprising at least an automatic transmission and a drive motor.

SUMMARY OF THE INVENTION

According to the said first aspect of the invention, two respective successive upshifts or two successive downshifts can be carried out as overlapping single shifts by the actuation of three shift elements of the automatic transmission in such manner that: a) when carrying out a first upshift or downshift a first shift element is disengaged in accordance with a first alternative or engaged in accordance with a second alternative, and a second shift element is engaged in accordance with the said first alternative or disengaged in accordance with the said second alternative; b) while carrying out the first upshift or downshift, the second shift element is prepared, with a view to a subsequent second upshift or downshift, for opening according to the first alternative or for closing according to the second alternative, and a third shift element is prepared for closing according to the first alternative or for opening according to the second alternative; c) the actuation of the second shift element on transition from the first upshift or downshift to the subsequent second upshift or downshift takes place according to the first alternative by a minimum selection or according to the second alternative by a maximum selection.

According to a second embodiment of the invention, while a first upshift or downshift is being carried out, for a subsequent second upshift or downshift a shift element, that is to be engaged during the said second upshift or downshift, is prepared for closing at a time which comes before the synchronization point of the progressing first upshift or downshift has been reached by a time interval that can be applied in a time-controlled or event-controlled manner.

According to a third embodiment of the invention, while a first upshift or downshift and/or while a second, subsequent upshift or downshift is being carried out, a torque of the drive motor is increased and/or decreased compared with a drive motor torque deduced from a driver's wish, in order to support the overlapped implementation of successive upshifts or downshifts.

The above three aspects according to the invention can be used either alone or in a combination of two aspects or in a combination of all three aspects for the operation of a drivetrain.

BRIEF DESCRIPTION OF THE DRAWINGS

The invention will now be described, by way of example, with reference to the accompanying drawings in which:

FIG. 1 is a drivetrain layout of a motor vehicle;

FIG. 2 is a transmission layout of an automatic transmission of the drivetrain with five shift elements;

FIG. 3 is a shift element matrix for the shift elements of the transmission layout in FIG. 2 to indicate which shift elements are engaged for each gear;

DETAILED DESCRIPTION OF THE INVENTION

Figure 4:
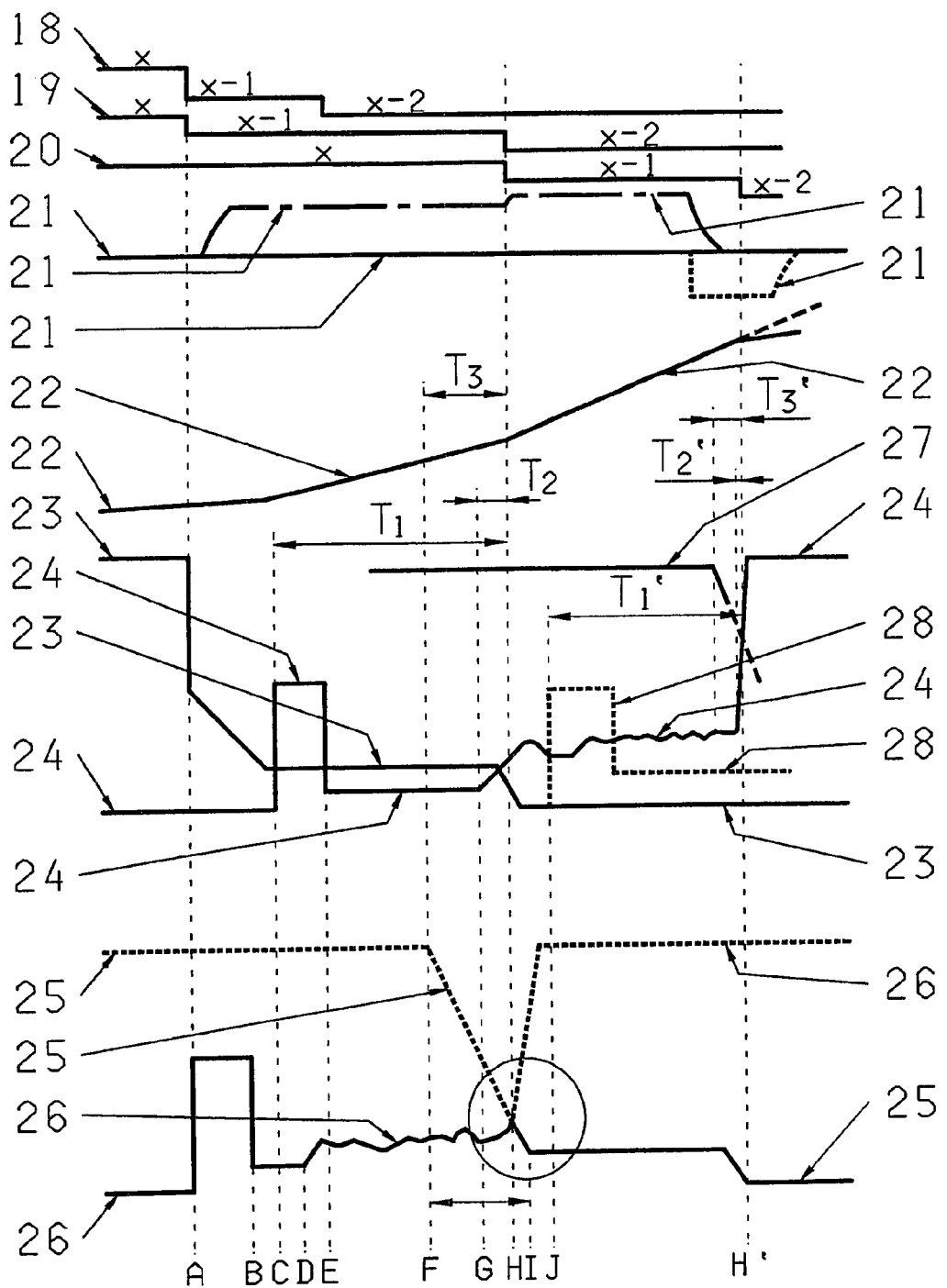
FIG. 4 is a first diagram to make clear the method, according to the invention, for operating a drivetrain of a motor vehicle which comprises an automatic transmission according to FIGS. 2 and 3.

FIG. 1 shows a very schematic representation of a drivetrain of a motor vehicle, the said drivetrain comprising a drive motor 1, an automatic transmission 2 and a driven wheel 3 of the motor vehicle. The automatic transmission 2 transfers the traction force produced by the drive motor 1 to the wheels 3 of the motor vehicle.

When the drivetrain according to FIG. 1 is operated in a traction mode, a power flow is directed in the direction of arrow 4 from the drive motor 1 toward the wheels 3 of the motor vehicle. In contrast, if the drivetrain is operated in thrust mode, for example, when braking or coasting, then the power flow is in the direction of arrow 5 from the wheels 3 toward the drive motor 1.

The invention concerns a method for operation of a drivetrain which comprises at least the drive motor 1 and the automatic transmission 2, as made clear by FIGS. 2 and 3. FIG. 2 shows a transmission layout 6 of the variable-speed automatic transmission 2 which comprises several transmission gearsets 7, 8 and 9 for the conversion of a transmission input torque, applied at a transmission input 10, into a transmission output torque at a transmission output 11. The transmission gearsets 7, 8, 9 of the automatic transmission 2, according to FIG. 1, are made as planetary transmission gearsets.

According to the transmission layout 6 of FIG. 2, besides the transmission gearsets 7 to 9, the automatic transmission 2 also has a total of five shift elements 12, 13, 14, 15 and 16; the shift element 12 being denoted as shift element A; shift element 13 as shift element B; shift element 14 as C; shift element 15 as D, and shift element 16 as shift element E. In each case, shift elements C and D are a brake while each of shift elements A, B and E is a clutch.

For the automatic transmission represented schematically in FIG. 2 comprising five shift elements 12 to 16, application of the shift matrix 17, shown in FIG. 3, enables six forward and one reverse gear to be engaged, the six forward gears "1" to "6" and the reverse gear "R" being listed in the left-hand column of the shift matrix 17 and the shift elements A to E along the top line of the matrix 17. Shift elements marked with a dot, in the shift element matrix 17, are engaged when the corresponding gear is engaged. According to the matrix, in each forward gear and in the reverse gear, two of the five shift elements are respectively engaged in each case. Thus, for example, for forward gear "1," the shift elements A and D are engaged, while for the reverse gear "R" shift elements B and D are engaged. On the other hand, in the respective gears, the other shift elements are disengaged.

Accordingly, to transmit force or torque from the transmission input 10 to the transmission output 11, in the automatic transmission 2 shown in FIGS. 2, 3, two shift elements are completely engaged and, in contrast, three shift elements are completely open for each forward gear and for the reverse gear.

To improve the shift speed, successive upshifts or successive downshifts are carried out with some overlap, namely, in such a manner that during a first upshift or downshift at least one shift element needed for the subsequent second upshift or downshift is prepared, while the first upshift or downshift is in progress, and this, in such a manner that as soon as a synchronization point of the first upshift or downshift in progress is reached, the next second upshift or downshift can be immediately carried out.

In this, as the first upshift or downshift and as the subsequent second upshift or downshift, single shifts are carried out or prepared for in each case.

The left-hand column of the Table below shows the downshifts that can be carried out with overlap and the upshifts that can be carried out with overlap by the automatic transmission 2, shown in FIGS. 2, 3, such that when, in the left-hand column, a downshift or upshift (in brackets) is entered after another downshift or upshift, the downshift or upshift (not in brackets) is the first downshift or upshift and the downshift or upshift (in brackets) is the second downshift or upshift for which at least one shift element is prepared while the first downshift or upshift is in progress.

| SHIFT ELEMENTS | | | | | |
|---|---|---|---|---|---|
| | A | B | C | D | E |
| Downshift | | | | | |
| 6-5 (5-4) | pe | e/pd | d | — | x |
| 5-4 (4-3) | e | d/pe | — | — | pd |
| 4-3 (3-2) | x | e/pd | pe | — | d |
| 3-2 (2-1) | x | d | e/pd | pe | — |
| 2-1 | x | — | d | e | — |
| Upshift | | | | | |
| 1-2 (2-3) | x | pe | e/pd | d | — |
| 2-3 (3-4) | x | e/pd | d | — | pe |
| 3-4 (4-5) | pd | d/pe | — | — | e |
| 4-5 (5-6) | d | e/pd | pe | — | x |
| 5-6 | — | d | e | — | x |

In the Table, shift elements, denoted as "e", are closed and, therefore, engaged during a first upshift or downshift to be carried out. In contrast, shift elements, denoted as "d", are open and, therefore, disengaged during a first upshift or downshift. Shift elements which, during a first upshift or downshift, are being prepared for closing and thus engagement or for opening and thus disengagement for a subsequent second upshift or downshift, are denoted as "pe" or "pd" in the above Table. Finally, when in the above Table, shift elements are denoted as "e/pd" or "d/pe", means that the shift elements in question are involved both in the first upshift or downshift and in the subsequent second upshift or downshift, so that a minimum selection or a maximum selection is carried out for the respective shift elements on the transition from the first upshift or downshift. Shift elements, denoted as "x", are and remain engaged during an upshift or downshift. In contrast, shift elements denoted as "-", are and remain open during an upshift or downshift.

From the Table above, it can be seen that with an automatic transmission having five shift elements in which, for every forward gear and for reverse gear, two respective shift elements are engaged and three shift elements are disengaged to carry out an overlapping upshift through two successive gears or an overlapping downshift through two successive gears. In each case, three shift elements are actuated; one of the three shift elements remaining active during both the first and the successive second upshift or downshift.

According to a first aspect of the present invention, in accordance with a first alternative, when a first upshift or downshift is carried out, a first shift element is closed and, therefore, disengaged, and a second shift element is opened and, therefore, engaged. While the first upshift or downshift is being carried out, the second shift element is then prepared for opening and, therefore, disengagement for the subsequent second upshift or downshift. While the first upshift or downshift is being carried out, a third shift element is prepared for closing and, therefore, engagement.

During transition from the first upshift or downshift to the subsequent second upshift, a downshift, the second shift element, which is active both during the first upshift and during the next second upshift or downshift, is actuated by virtue of a minimum selection.

The first alternative of the first aspect of the present invention is described below with reference to FIG. 4, considering the example of two successive downshifts that can be carried out as overlapped single shifts.

FIG. 4 shows the time variations of various signals: a signal variation 18 visualizes a driver's-wish-dependent desired gear; a signal variation 19 visualizes a target gear determined on the basis of the desired gear; a signal variation 20 visualizes a gear currently engaged; a signal variation 21 visualizes a torque of the drive motor 1 of the drivetrain, and a signal variation 22 visualizes a speed of the drive motor 1.

Signal variations 23, 24, 25 and 26 visualize the actuation or time behavior of the three shift elements involved in carrying out two successive downshifts; the signal variation 23 visualizes the time behavior of a first shift element that has to be opened and, therefore, disengaged for the first downshift, while the signal variation 26 visualizes the time behavior of the second shift element that has to be closed and, therefore, engaged, for the first downshift; the signal variation 25 visualizes the time behavior of the second shift element that has to be prepared for opening and, therefore, disengagement for the subsequent second downshift, and the signal variation 24 visualizes the time behavior of the third shift element that has to be prepared for closing and, therefore, engagement, for the subsequent second downshift.

Accordingly, the signal variations 25 and 26 each concern the second shift element, which is active both during the first downshift and during the subsequent second downshift, such that in the signal variations 25 and 26 the continuous lines represent an active operating sequence of this second shift element and the broken lines represent a passive background calculation for the second shift element.

At time A, there is a change of the desired gear (see signal variation 18) and, derived therefrom, a change of the target gear (see signal variation 19) in the sense of a desired downshift by one gear (x−1), such that this triggers the overlapped implementation or preparation of successive downshifts, namely, in such a manner that at time A, on one hand, the first shift element that is to be closed and, therefore, disengaged to carry out the first downshift (see signal variation 23) begins its shifting phase and, on the other hand, the second shift element that is to be closed and, therefore, engaged, to carry out the first downshift (see signal variation 26) undergoes rapid filling. This rapid filling takes place between times A and B.

The second shift element that is to be prepared for the subsequent second downshift while carrying out the first downshift, in the sense of a background calculation (see signal variation 25) and the third shift element (see signal variation 24) are set to a defined condition at time A.

On completion of the rapid filling of the second shift element that is to be closed and. therefore. engaged, in the first downshift (see signal variation 26), the second shift element changes from the rapid filling phase to a filling equalization phase. This filling equalization phase extends between times B and D. The rapid filling phase, between times A and B, and the filling equalization phase, between times B and D, together define the entire filling phase of the second shift element that is to be closed during the first downshift. At time D, the second shift element, to be closed and, therefore, engaged during the first downshift (see signal variation 26), changes from the filling phase to the shift phase.

During the implementation of the first downshift in which the first shift element is opened, and thus disengaged in accordance with signal variation 23 and the second shift element is closed, and thus engaged in accordance with signal variation 26; shift elements are prepared in case a subsequent second downshift has to be carried out. Thus from time C, the third shift element which, for a possible subsequent and second downshift, would have to be closed and, therefore, engaged, is prepared (see signal variation 24) by rapid filling which lasts between times C and E. On completion of the rapid filling of the third shift element at time E, the shift element changes to a filling equalization phase which lasts until time G, as shown in FIG. 4.

Likewise, during the implementation of the first downshift, the second shift element already involved in the first downshift by virtue of a passive background calculation (see signal variation 25) is prepared for opening or disengagement in case there is to be a subsequent second downshift. At time F, a transition phase of the second shift element prepared for the subsequent second downshift is started and, at time H which corresponds to a synchronization point of the first downshift, a change from the first downshift to the subsequent second downshift takes place.

For the second shift element, which in the first downshift is engaged, and thus engaged, and in the subsequent second downshift is disengaged, and thus disengaged, at time H and in relation to the first downshift there occurs a transition from an active operating sequence to a passive background calculation and in relation to the subsequent second downshift a transition from a passive background calculation to an active sequence. Accordingly, on reaching time H but at the very latest on reaching time 1, the shift elements prepared during the first downshift are the active shift elements of the subsequent second downshift.

During the subsequent second downshift, analogously to the first downshift shift elements for a possible subsequent third downshift, are prepared (see signal variations 27 and 28).

According to a second aspect of the present invention, during the implementation of the first downshift, for the subsequent second downshift the third shift element that is to be engaged during the second downshift (see signal variation 24) is prepared for closing by rapid filling at a time C, which occurs before the sychronization point of the first downshift in progress has been reached at time H by a first time interval $T_1$ applicable in a time-controlled or event-controlled way. The first time interval $T_1$, applicable by time- or event-control can, for example, be determined by virtue of a time reserve or a speed difference relative to the synchronization point H of the first downshift.

When time C, which is determined from the synchronization point H and the applicable first time interval $T_1$, as shown in FIG. 4, occurs at a time after the end of the rapid filling phase of the second shift element to be engaged during the first downshift, i.e., at a time later than time B, preparation of the third shift element that is to be engaged during the second downshift (see signal variation 24) is started immediately. In contrast, if time C, which is determined from the synchronization point H of the first downshift in progress and from the applicable first time interval $T_1$, occurs at a time before the end (time B) of the rapid filling phase of the second shift element to be engaged during the first downshift, preparation of the third shift element is delayed until the rapid filling of the second shift element to be closed during the first downshift has been completed.

As already mentioned, the third shift element, which is prepared for closing for the second downshift while the first downshift is taking place (see signal variation 24), is changed over at time G from the preparation phase to the shift phase. This time G occurs at a second time interval $T_2$, which can be determined as a function of time or events, before the synchronization point H of the first downshift has been reached.

As shown in FIG. 4, if time G, determined from the synchronization point H of the first downshift and the applicable second time interval $T_2$, occurs later than the end of the rapid filling phase (time E) of the third shift element that is to be engaged during the second downshift, the third shift element to be engaged during the second downshift is changed directly from the preparation phase to the shift phase.

On the other hand, if time G, determined from the synchronization point H of the first downshift in progress and the applicable second time interval $T_2$, occurs earlier than the end of the rapid filling phase (time E) of the third shift element due to be engaged during the second downshift, then the change of the third shift element from its preparation phase to its shift phase is delayed until the rapid filling phase of the third shift element has been completed.

As explained earlier, the second shift element, which is prepared in the sense of a background calculation for opening and thus disengagement for the subsequent second downshift while the first downshift is in progress, is changed from the preparation phase to the shift phase at time F. Time F occurs at a time interval $T_3$ applicable in a time- or event-controlled way before the synchronization point H of the first downshift has been reached.

In the example embodiment shown, at time F, it is decided whether the second downshift prepared for during the first downshift will actually be carried out. Namely, a prepared next downshift is only actually carried out if the driver so wishes. From FIG. 4, it can be seen that at time F, in accordance with the signal variation 18 which represents the driver's wishes, a further downshift (x−2) is called for in order to reach the desired gear so, in the example of FIG. 4, the second downshift is then also actually carried out.

As already explained above, during the second downshift as well, corresponding shift elements are prepared in accordance with signal variations 27 and 28 for a third subsequent downshift such that, in FIG. 4, for the third downshift to be prepared for during the second downshift. the corresponding applicable first time interval $T'_1$, second time interval $T'_2$ and third time interval $T'_3$ relate to a synchronization point H' of the second downshift.

From FIG. 4, it can be seen that at a time defined by the synchronization point H' of the second downshift and the applicable third time interval $T'_3$, on the basis of the signal variation 18 that represents the driver's wishes, no further downshift is required in order to reach the desired gear so the third downshift, prepared for while the second downshift is taking place, is not carried out, but instead discontinued.

As can be seen from FIG. 4, in accordance with the signal variation 20 the current gear is set to a new value by recognition of the synchronization points H or H' of a shift carried out while, in accordance with the signal variation 19, the target gear changes to the next gear or remains unchanged depending on the desired gear according to the signal variation 18.

According to a third aspect of the present invention, in the example embodiment shown in FIG. 4, during the implementation of the first downshift and during that of the second downshift, a torque of the drive motor is increased and/or reduced compared with a torque derived from the driver's wish, in order thereby to support the overlapped implementation of the successive downshifts. Thus, the signal variation 21, represented in FIG. 4 as a continuous line, corresponds to a drive motor torque derived from a driver's wish. According to a first embodiment indicated in FIG. 4 as a dot-dash line, the drive motor torque is increase, during the implementation of both the first and the second downshift, relative to the drive motor torque derived from the driver's wish. In contrast, according to a second embodiment indicated in FIG. 4 as a dotted line, at the end of the second downshift, the drive motor torque is reduced relative to the drive motor torque derived from the driver's wish. Below, both embodiments will be explained in more detail.

The elevation of the drive motor torque, indicated in FIG. 4 as a dot-dash line, relative to the drive motor torque derived from the driver's wish, takes place when the drivetrain is operated either in a thrust mode or in part-load traction mode. During every downshift carried out in the thrust or part-load traction operation, the drive motor torque is increased, relative to the torque derived from the driver's wish, and during each downshift carried out, it is checked whether a prepared subsequent downshift corresponds to the driver's wish. This is done at a time that depends, on one hand, on the synchronization point H and, on the other hand, on the applicable third time interval $T_3$, i.e., in the example embodiment of FIG. 4 at time F.

At this time, when on the basis of the driver's wish, a subsequent downshift is required, the torque elevation during the first downshift is changed to the torque elevation during the second downshift. It can be seen in the example embodiment illustrated that the torque elevation during the second downshift is larger than that during the first downshift. In contrast, it can also be that the torque elevation of the second downshift is smaller than that of the first downshift. Likewise, the two torque elevations can be of equal size. There is a ramp-like transition preferably between the two torque elevations.

In contrast, at the above time defined by the synchronization point H and the applicable third time interval $T_3$, on the basis of the driver's wish, if no subsequent downshift is required, the prepared follow-up downshift is interrupted and the drive motor torque elevation is ended in order to complete the shift. This is shown in FIG. 4 for the third downshift prepared during the second downshift.

During the implementation and preparation of successive downshifts, when the drivetrain is operating in a traction mode, during each downshift carried out, at a time applicable by virtue of time- or event-control, namely at the time that depends on the synchronization point H and the applicable third time interval $T_3$, it is again checked whether a prepared next shift corresponds to a driver's wish. If, as shown in FIG. 4, for the third downshift prepared for during the second downshift, this is not the case, then the prepared follow-up downshift is interrupted and, in order to complete the shift during the traction operation, the drive motor torque reduction, represented in the signal variation 21 of FIG. 4, as a dotted line, relative to the torque derived from the driver's wish is carried out.

In contrast, when at the time a subsequent downshift is desired, as is the case in FIG. 4 for the second downshift prepared for during the first downshift, the drive motor torque reduction is not carried out. Accordingly, torque reduction during downshifts only takes place when a shift process is to be ended, i.e., when no subsequent shift is required. Furthermore, the above torque reduction only takes place during traction operation and then both under full load and under part load. On the other hand, during the thrust operation, this torque reduction does not take place during downshifts.

In the example embodiment of FIG. 4, two successive downshifts can be carried out and prepared for as overlapping single downshifts by controlling three shift elements such that, to carry out the first downshift, according to FIG. 4, a first shift element (see signal variation 23) is opened and thus disengaged, and a second shift element (see signal variation 26) is closed and thus engaged. For the subsequent second downshift, during the implementation of the first downshift, the second shift element (see signal variation 25) is prepared for opening and thus disengagement and a third shift element (see signal variation 24) is prepared for closing and thus engagement. Upon progressing from the first downshift to the subsequent second downshift, the second shift element is actuated by a minimum selection between the signal variations 25 and 26.

Figure 6:
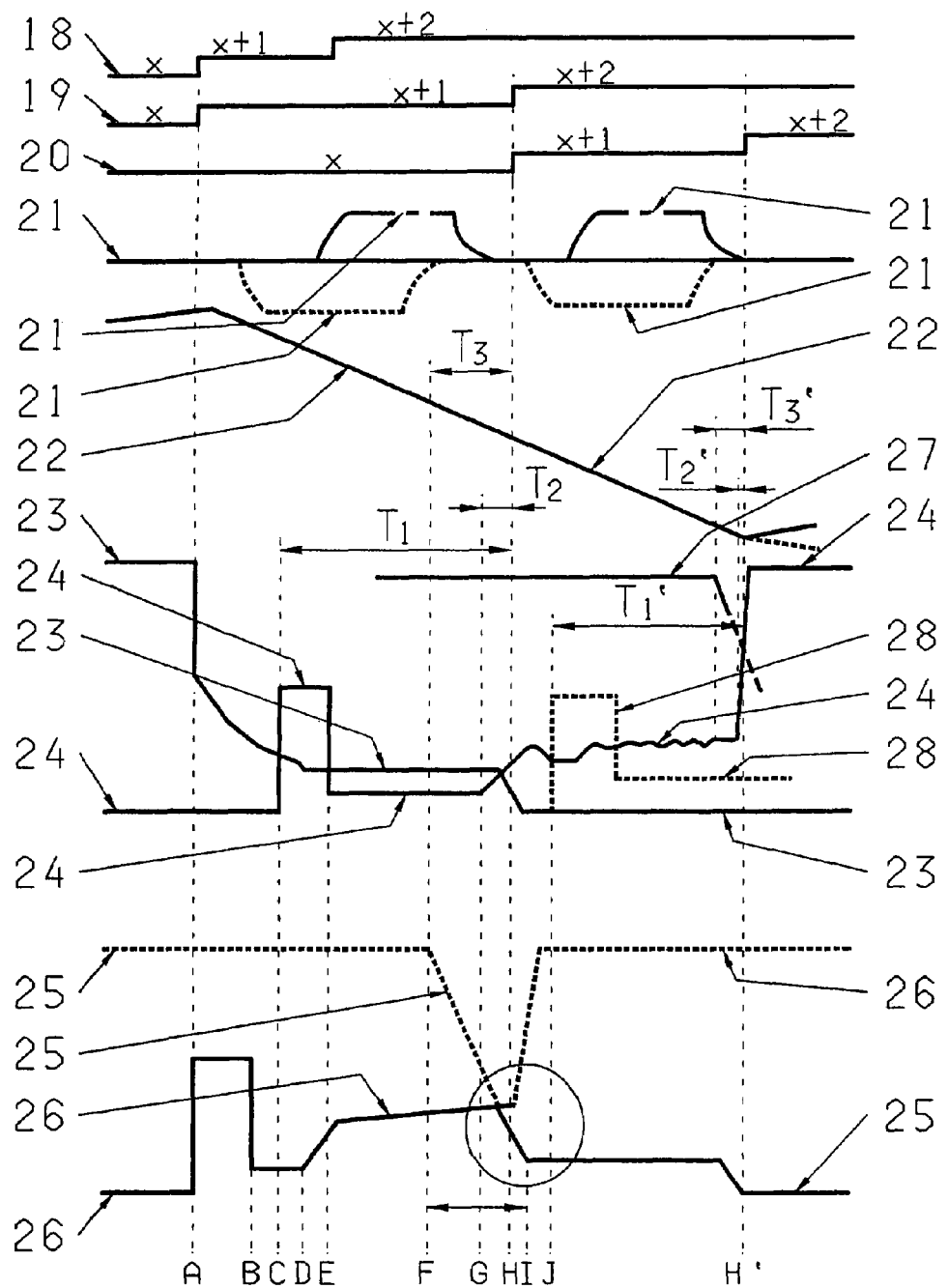
FIG. 6 is a third diagram to make clear the method, according to the invention, for operating a drivetrain of a motor vehicle, which comprises an automatic transmission according to FIGS. 2 and 3.

FIG. 6 shows a procedure, according to the invention, for carrying out and preparing successive upshifts as overlapped single shifts. In relation to the control of the three shift elements in accordance with the first and second aspects of the present invention, there are no differences from the procedure of FIG. 4, so that to avoid unnecessary repetitions, the same indexes will be used for the example in FIG. 6.

To carry out successive upshifts in accordance with FIG. 6, compared with carrying out successive downshifts as in FIG. 4, there is only one difference relating to the third aspect of the present invention, which concerns increasing or reducing the drive motor derived from a driver's wish. According to FIG. 6, for successive upshifts during the thrust operation of the drivetrain, the torque is elevated for both upshifts, according to the dot-dash line, associated with signal variation 21 while, in contrast, during traction operation of the drivetrain, the torque is reduced for both upshifts, as shown by the dotted line, associated with signal variation 21.

A second alternative of the first aspect of the invention for carrying out successive downshifts or successive upshifts as overlapped single shifts is described below with reference to FIG. 5, considering the example of successive downshifts and, again, for the example embodiment of FIG. 5 the same identifiers are used as for that of FIG. 4.

Figure 5:
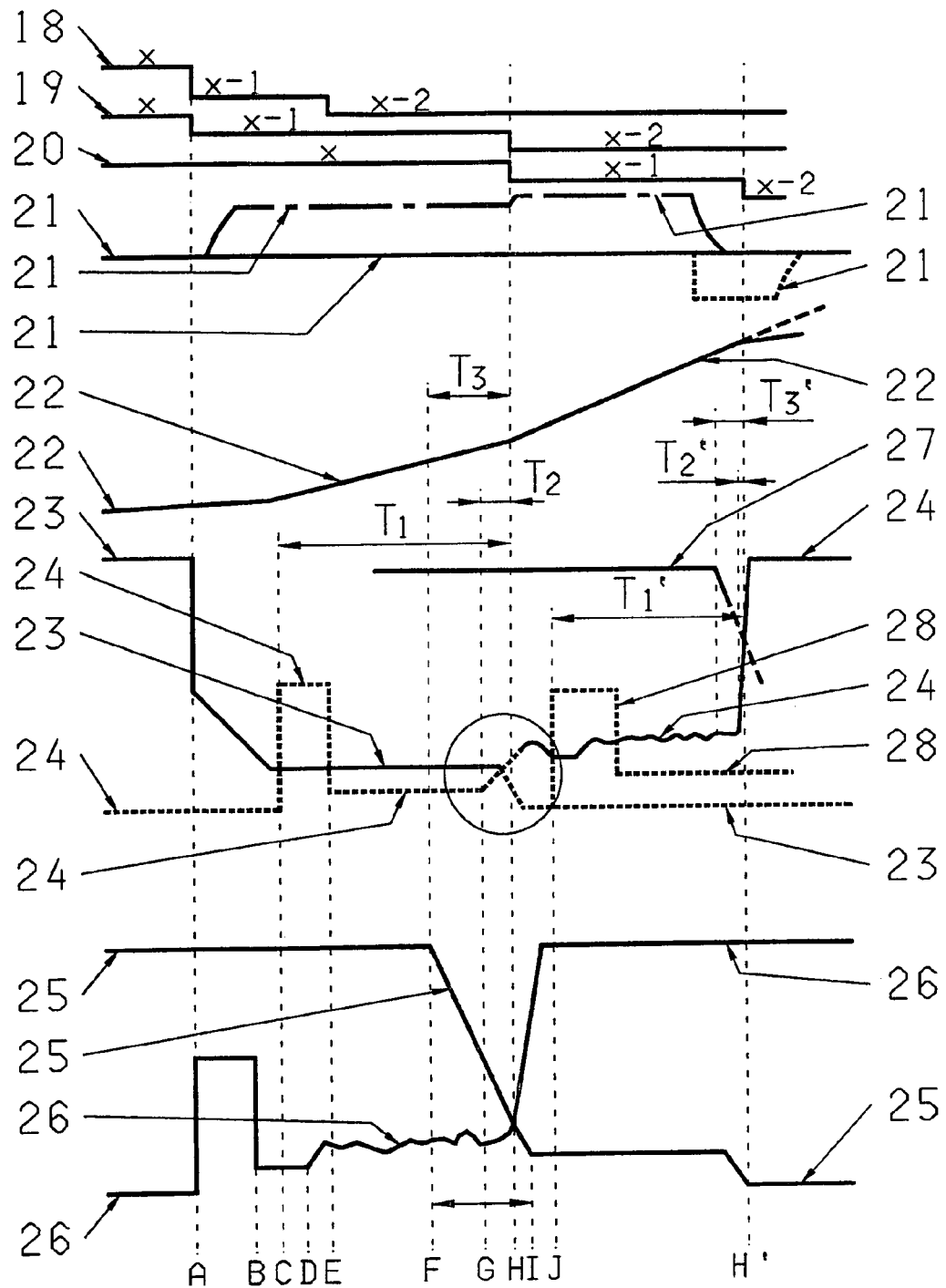
FIG. 5 is a second diagram to make clear the method, according to the invention, for operating a drivetrain of a motor vehicle which comprises an automatic transmission according to FIGS. 2 and 3.

According to the second alternative of the first aspect of the present invention represented in FIG. 5, two successive downshifts can be carried out by actuating three shift elements in such a manner that to carry out the first downshift, a first shift element (see signal variation 26) is closed and thus engaged, and a second shift element (see signal variation 23) is opened and thus disengaged. While the first downshift is being implemented, for a subsequent second downshift the second shift element (see signal variation 24) is prepared for closing and thus engagement in the sense of a background calculation and a third shift element (see signal variation 25) is prepared for opening and, therefore, disengagement.

Accordingly, in the example embodiment of FIG. 5 as well the second shift element has a dual function and is active during both the first and the second downshifts and, in accordance with this second alternative of the first aspect of the invention, the control of the second shift element, when changing from the first downshift, to the second downshift takes place by virtue of a maximum selection.

At time A in FIG. 5, there occurs a change of the desired gear (see signal variation 18) and, derived from this, a change of the target gear (see signal variation 19) in the sense of a desired downshift by one gear (x−1), which triggers the overlapping implementation or preparation of successive downshifts, namely, in such a manner that at time A, on one hand, the first shift element (signal variation 26) that is to be engaged and thus engaged when the first downshift is carried out is subjected to rapid filling. This rapid filling takes place between times A and B and, on the other hand, the second shift element (signal variation 23) that is to be opened and thus disengaged when the first downshift is carried out begins its shift phase. The second shift element (signal variation 24) which is to be prepared for the subsequent second downshift while the first downshift is being carried out and the third shift element (signal variation 25), are set to a defined condition at time A.

Upon completion of the rapid filling of the first shift element (signal variation 26) to be engaged and engaged for the first downshift, the first shift element passes from the rapid filling phase to a filling equalization phase. This filling equalization phase lasts between times B and D. Taken together, the rapid filling and the filling equalization phases define the entire filling phase of the first shift element to be engaged during the first downshift.

At time D, the first shift element (signal variation 26), which is to be engaged and thus engaged during the first downshift, is changed from the filling phase to the shift phase.

During the implementation of the first downshift, during which the second shift element (signal variation 23) is opened and thus disengaged and the first shift element (signal variation 26) is closed and thus engaged, shift elements are prepared for the possibility that a subsequent second downshift has to be carried out. Thus, at time C, the preparation of the second shift element (signal variation 24) that will be closed and thus engaged in the event of a subsequent second downshift, in the sense of a background calculation, takes place by rapid filling which lasts between times C and E. On completion of the rapid filling at time E, the shift element changes to a filling equalization phase which, as in FIG. 4, lasts until time G. While the first downshift is being carried out, in case there is to be a subsequent second downshift, the third shift element (signal variation 25) is also prepared for opening or disengagement. At time F, a transition phase of the third shift element prepared for the subsequent second downshift is begun.

Between times G and H, for the second shift element which is opened, and thus disengaged, in the first downshift and closed and, therefore, engaged, in the subsequent second downshift, there takes place in relation to the first downshift a transition from an active sequence to a passive background calculation and, in relation to the subsequent second downshift, a transition from a passive background calculation to an active sequence. Accordingly, on reaching time H, the shift elements prepared during the first downshift become the active shift elements of the subsequent second downshift.

Analogously to the first downshift, during the subsequent second downshift shift elements are prepared for the eventuality of a third subsequent downshift (see signal variations 27 and 28).

In relation to the second aspect of the present invention, i.e., in relation to the applicable time intervals $T_1$, $T_2$ and $T_3$ on whose basis, on one hand, the preparation of the shift element to be engaged during the second downshift and the transition of the shift elements to be engaged or disengaged during the second downshift from the preparation phase to the shift phase take place. The example embodiment of FIG. 5 corresponds to the example embodiment of FIG. 4 so reference should be made to the description given earlier in this connection.

Furthermore, in relation to the third aspect of the present invention, the example embodiment of FIG. 5 corresponds to the example embodiment of FIG. 4, i.e., in relation to the details concerning the drive motor torque increase or torque reduction while carrying out overlapping downshifts. Concerning these details too, reference can be made to the earlier descriptions.

Finally, let it also be said that successive upshifts, of course, can be carried out as overlapping single shifts by analogy with the example embodiment of FIG. 5, in accordance with the second alternative of the first aspect of the invention.

REFERENCE NUMERALS 1 drive motor
2 automatic transmission
3 wheel
4 arrow
5 arrow
6 transmission layout
7 transmission gearset 8 transmission gearset
9 transmission gearset
10 transmission input
11 transmission output
12 shift element A
13 shift element B
14 shift element C
15 shift element D
16 shift element E
17 shift element matrix
18 signal variation
19 signal variation
20 signal variation
21 signal variation
22 signal variation
23 signal variation
24 signal variation
25 signal variation
26 signal variation
27 signal variation
28 signal variation

The invention claimed is:

1. A method of operating a drivetrain for a motor vehicle comprising at least an automatic transmission and a drive motor, the method improving a shift speed of at least one of successive upshifts and successive downshifts in an overlapped manner such that during a first upshift or a first downshift at least one shift element required for a successive upshift or a successive downshift is prepared during the first upshift or the first downshift such that when a synchronization point of the first upshift or the first downshift is reached, the successive upshift or the successive downshift can be immediately carded out, the method comprising the steps of:

carrying out one of two successive upshifts or two successive downshifts as overlapping single shifts by actuating three shift elements in such manner that:

a) during implementation of the first upshift or the first downshift a first shift element is disengaged, in accordance with a first alternative, or the first shift element is engaged, in accordance with a second alternative, and a second shift element is engaged, in accordance with the first alternative, or the second shift element is disengaged, in accordance with the second alternative;

b) during implementation of the first upshift or the first downshift, for the successive upshift or the successive downshift, the second shift element is prepared for disengagement, in accordance with the first alternative, or the second shift element is prepared for engagement, in accordance with the second alternative, and a third shift element is prepared for engagement, in accordance with the first alternative, or the third shift element is prepared for disengagement in accordance with the second alternative; and c) actuating the second shift element, upon transiting from the first upshift or the first downshift to the successive upshift or the successive downshift, by a minimum selection, according to the first alternative, or by a maximum selection, according to the second alternative.

2. The method according to claim 1, further comprising the step of, during implementation of the first upshift or the first downshift, carrying out a passive background calculation to prepare the second shift element involved with an active operating sequence during the first upshift or the first downshift for the successive upshift or the successive downshift, and when a change occurs from the first upshift or the first downshift to the successive upshift or the successive downshift, and, when a synchronization condition is reached, permitting a transition of the second shift element to take place from the background calculation to the active sequence.

3. The method according to claim 1, further comprising the step of, during implementation of the successive upshift or the successive downshift, carrying out a passive background calculation for the second shift element involved in the successive second upshift or the successive second downshift with an active sequence.

4. The method according to claim 1, further comprising the step of, during implementation of each upshift or each downshift, preparing the second shift element and the third shift element for the successive upshift or the successive downshift, but only carrying out the successive upshift or the successive downshift if, at a time applicable in a time-controlled or event-controlled manner, the upshift or the downshift prepared for corresponds to a wish of a driver.

5. A method of operating of a drivetrain of a motor vehicle comprising at least an automatic transmission and a drive motor, the method improving a shift speed of successive upshifts or successive downshifts with overlap such that during a first upshift or a first downshift at least one shift element required for a successive upshift or a successive downshift is prepared during the first upshift or the first downshift such that when a synchronization point of the first upshift or the first downshift is reached, the successive upshift or the successive downshift can be immediately carried out;

the method comprising the steps of:

during implementation of the first upshift or the first downshift, for the successive upshift or the successive downshift, preparing a shift element for engagement that is to be engaged during the successive upshift or the successive downshift at a time that occurs before the synchronization point of the first upshift or the first downshift has been reached, by a first time interval that can be applied in a time-controlled or event-controlled manner.

6. The method according to claim 5, further comprising the step of if the time, determined from the synchronization point of the first upshift or the first downshift and the applicable first time interval, occurs before an end of a rapid filling phase of a shift element that is to be engaged during the first upshift or the first downshift, delay preparing the shift element to be engaged during the successive upshift or successive downshift until the rapid filling phase of the shift element to be engaged, during the first upshift or the first downshift, is completed, or otherwise immediately preparing the shift element to be engaged during the successive upshift or the successive downshift.

7. The method according to claim 5, further comprising the step of, for the successive upshift or the successive downshift, changing the shift element, prepared for engagement, from its preparation phase to a shift phase at a time before the synchronization point of the first upshift or the first downshift is reached, by a second time interval applicable by virtue of a time control or an event control.

8. The method according to claim 5, further comprising the step of, if this time, determined from the synchronization point of the first upshift or the first downshift and the applicable second time interval, occurs before an end of a rapid filling phase of the shift element to be engaged during the successive upshift or successive downshift, delay changing from the preparation phase to the shift phase until the rapid filling phase of the shift element to be engaged during the successive upshift or the successive downshift is completed, and otherwise immediately changing the shift element to be engaged, during the successive upshift or the successive downshift, from its preparation phase to the shift phase.

9. The method according to claim 5, further comprising the step of, during the implementation of the first upshift or the first downshift, for the successive upshift or the successive downshift, preparing the shift element, to be engaged during the successive upshift or the successive downshift, for engagement at a beginning of the first upshift or the first downshift, and changing the shift element, being prepared for disengagment during the successive upshift or the successive downshift, from its preparation phase to a shift phase at a time that occurs before the synchronization point of the first upshift or the first downshift is reached, by a third time interval applicable in a time-controlled or an event-controlled manner.

10. A method of operating of a drivetrain of a motor vehicle comprising at least an automatic transmission and a drive motor, the method improving a shift speed of successive upshifts or successive downshifts with overlap such that during a first upshift or a first downshift at least one shift element required for a successive upshift or a successive downshift is prepared during the first upshift or the first downshift such that when a synchronization point of the first upshift or the first downshift is reached, the successive upshift or the successive downshift can be immediately carried out;

the method comprising the steps of:

during implementation of the first upshift or the first downshift and/or during the successive upshift or the successive downshift, a torque of the drive motor is one of increased and decreased, relative to a drive motor torque derived from a wish of a driver, in order to support overlapped implementation of the successive upshifts or the successive downshifts.

11. The method according to claim 10, further comprising the step of, in order to carry out successive downshifts during a traction operation of the drivetrain, checking, during each downshift, at a time applicable by virtue of a time or an event control, whether a follow-up shift that has been prepared for corresponds to a driver's wish and, if at the time, on a basis of the driver's wish no follow-up shift is desired, discontinuing the prepared follow-up shift and reducing drive motor torque, relative to the drive motor torque derived from the driver's wish, to end the shift, but if, at the time, on the basis of the driver's wish a follow-up shift is desired, carrying out the prepared follow-up shift without reducing the drive motor torque.

12. The method according to claim 10, further comprising the step of, in order to carry out successive downshift when the drivetrain is in a thrust operation or a partly-loaded traction operation, increasing the torque of the drive motor, during each downshift carried out, relative to the drive motor torque derived from the driver's wish, and checking, during each carried out downshift, at a time applicable by virtue of a time or an event control, whether a follow-up shift that has been prepared for corresponds to the driver's wish, and if at the time, on the basis of the driver's wish a follow-up shift is desired, effecting a transition between torque elevations of the successive downshifts, but if at the time, on the basis of the driver's wish a follow-up shift is undesired, discontinuing the prepared follow-up shift and ending elevation of the drive motor torque to end the shift.

13. The method according to claim 10, further comprising the step of, in order to carry out successive upshifts during the fraction operation of the drivetrain, reducing the torque of the drive motor, during each carried out upshift, relative to the torque derived from the driver's wish, and, in order to carry out successive upshifts during a thrust operation of the drivetrain, increasing the drive motor torque, during each carried out upshift, relative to the torque derived from the driver's wish.

14. The method according to claim 10, further comprising the step of equipping the automatic transmission of the drive motor with five shift elements and, for both torque transfer and force transfer, engaging two shift elements while disengaging three shift elements.

* * * * *